_United States Patent Office_ 2,791,882
Patented May 14, 1957

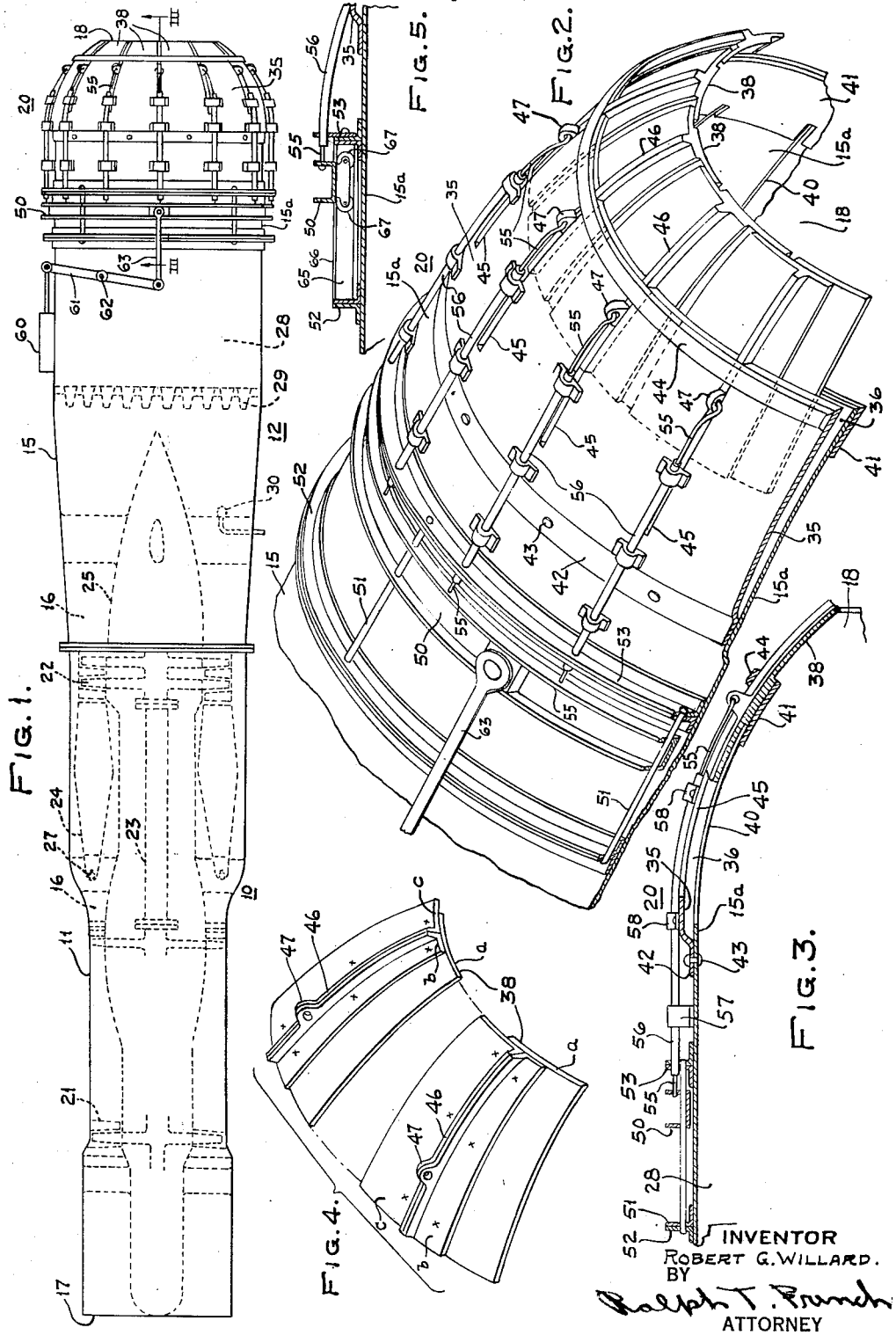

2,791,882

VARIABLE AREA NOZZLE FOR JET PROPULSION ENGINE

Robert G. Willard, Wilkinsburg, Pa., assignor to Westinghouse Electric Corporation, East Pittsburgh, Pa., a corporation of Pennsylvania Application September 29, 1950, Serial No. 187,579

4 Claims. (Cl. 60—35.6)

This invention relates to jet propulsion power plants, and more particularly to apparatus for varying the flow area of an aviation jet engine nozzle.

It is an object of the invention to provide improved variable area exhaust nozzle apparatus for a turbojet or the like, comprising retractile elements disposed in an assembly of the iris type presenting a circular opening for all settings of the nozzle.

Another object of the invention is the provision of improved adjustable nozzle apparatus to which actuating forces can be applied without necessitating movement in opposition to pressure of exhaust gases, so that only ordinary friction forces will resist movement of the nozzle elements.

A further object is to provide variable area nozzle mechanism which is adapted to occupy space available within the outside dimensions of the engine envelope.

It is another object of the invention to provide an improved nozzle gate mechanism in which maximum sealing efficiency is effected when the fluid pressures are highest, and constructed and arranged so that any leakage gases can be directed to the rear.

These and other objects are effected by the invention as will be apparent from the following description and claims taken in connection with the accompanying drawings, forming a part of this application, in which:

Fig. 1 is a diagrammatic longitudinal view of a typical aviation turbojet power plant equipped with variable area nozzle apparatus constructed in accordance with the invention;

Fig. 2 is a fragmentary, enlarged detail perspective view of the nozzle gate apparatus shown in Fig. 1;

Fig. 3 is a fragmentary, enlarged detail sectional view taken substantially along line III—III of Fig. 1;

Fig. 4 is a diagrammatic perspective view of two of the slidable leaves of the nozzle assembly shown in Fig. 2; and Fig. 5 is a fragmentary sectional view of a different form of actuating mechanism adapted to be substituted for that illustrated in Fig. 3.

As shown in Fig. 1 of the drawing, a typical aircraft turbojet power plant may comprise a gas turbine engine 10 having a generally cylindrical outer casing 11, and an afterburner 12 having a casing structure 15 suitably bolted to the casing 11. The casing sections of the power plant thus provide a continuous flow passageway 16, which extends from an air inlet 17 formed in the engine casing 11, to a rearwardly directed gas discharge nozzle 18 formed in the casing structure 15 of the afterburner and having a flow area that is variable by adjustment of movable nozzle gate apparatus 20, hereinafter more fully described. The usual operating elements of the engine 10 are disposed in generally axial alignment in the casing 11 and include an axial-flow compressor 21, a gas turbine 22 drivingly connected thereto by means of a shaft 23, and annular main combustion apparatus 24 which is interposed in passageway 16 between the compressor discharge and the turbine inlet. A flow guiding fairing or cone 25 may be supported downstream of the turbine within the casing structure 15, as shown. Suitable fuel nozzles 27 may be mounted in the upstream end of the combustion apparatus 24.

The space within the afterburner casing 15 communicating with the passageway 16 constitutes an afterburner combustion chamber indicated by the reference character 28, in which is mounted a flameholder device 29 and afterburner fuel nozzles 30 adapted to be supplied with fuel through the medium of a suitable control system (not shown), when thrust augmentation is desired.

In operation, air entering the inlet 17 is compressed and delivered by the compressor 21 to the combustion apparatus 24, where fuel continuously emitted from the nozzles 27 is initially ignited by electrical means (not shown) and burned to provide hot combustion gases for driving the turbine 22. If the afterburner 12 is not in operation, the gases expanded through the turbine may be conducted in unchanged state through the afterburner and expelled by way of the nozzle 18 in the form of a jet establishing a propulsive thrust sufficient for normal cruising service. During operation of the afterburner to provide increased thrust, however, the nozzles 30 are operative to supply fuel into the turbine exhaust gases, which include sufficient residual air to support further combustion and release of additional energy within the combustion chamber 28, thereby augmenting the thrust at the nozzle 18.

According to the invention, as shown in Figs. 2 and 3, the nozzle gate apparatus 20 comprises an annular converging nozzle extension 15a of the casing structure 15, an outer annular guide section or retainer wall 35 overlying and spaced from the casing extension forming an annular recess 36, and a plurality of preferably curved gate elements or leaves 38 which are slidably mounted within the recess 36. The converging nozzle extension 15a may be provided with longitudinal slots 40 to facilitate bending to a curved contour, the terminal end being reinforced by means of a ring 41 welded thereto. The outer guide section 35 is similarly curved for disposition concentrically about the nozzle extension 15a, and carries an inwardly offset flange 42 adapted to be secured to the extension by suitable means, such at rivets 43. The outer or downstream end of the guide section carries a bail ring 44, which overlaps a plurality of slots 45 that are formed longitudinally in the guide section.

As best shown in Fig. 4, each of the gate plates or leaves 38 comprises a base segment a, preferably curved to constitute substantially a segment of a sphere, and outer segments b and c which are welded to the base segment in laterally offset relation so as to form complementary surfaces adapted to overlap in sliding relation when the gate leaves are aligned for assembly, as indicated in Fig. 4. A longitudinal flange 46 and an apertured lug 47 are formed on the outer surface of each gate leaf 38. With the gate leaves 38 assembled and slidably mounted in the annular recess 36, as shown in Fig. 2, the flanges 46 are adapted to fit into the respective slots 45, with the lugs 47 projecting outwardly of the outer guide section 35. It will thus be apparent that when the curved gate leaves 38 are moved to the extended position illustrated in Fig. 2, so that the outer ends thereof project downstream of the converging nozzle extension 15a, the flow area of the nozzle 18 will be a minimum. Upon retraction or forward movement of the gate leaves 38 into the recess 36, however, the converging ends of the leaves are withdrawn from the nozzle 18 to enlarge the flow area.

For actuating the gate leaves 38 simultaneously, there is provided an annular operating channel ring 50, which is slidably mounted for movement in an axial direction on a number of stationary longitudinally disposed rods 51, the ends of which are fixed in spaced annular flanges 52 and 53 carried by the casing structure 15. Secured to the operating ring 50 are the forward ends of a suitable number of circumferentially spaced rods or wires 55, each of which extends rearwardly through a stationary guide tube 56 into operative engagement with the lug 47 of the gate leaf 38. The guide tubes 56 may be supported by holding elements 57 secured to the casing extension 15a and similar elements 58 secured to the casing section 35. A motor device or actuator 60 (see Fig. 1) may be provided for selectively moving the operating ring 50 through the medium of a yoke member 61 pivoted on pins 62, which are carried at opposite sides of the casing structure 15 and operatively connected to the ring 50 by linkage such as that designated 63. It will be understood that the actuator 60 is constructed and arranged for response to operation of a suitable control apparatus (not shown) for effecting movement of the nozzle gate mechanism to increase or reduce the nozzle flow area as desired.

Referring to Fig. 5 of the drawing, an alternative mounting for the operating ring 50 is illustrated, comprising longitudinally disposed track or channel members such as that designated 65, which may be substituted for the rods 51 shown in Fig. 3. Each channel member carries an outer flange 66 which is operatively engaged by suitable rollers 67 carried by the operating ring 50. It will be evident that such an arrangement is adapted to minimize frictional resistance to axial movement of the operating ring 50 for actuating the wires 55 to open or close the adjustable nozzle apparatus already described.

From the foregoing, it will be seen that a gas turbine power plant equipped with the described gate apparatus for varying the flow area of the exhaust nozzle will be quickly responsive to operation of the aircraft control mechanism, since the gate leaves or plates are adapted to be retracted or extended in substantially circular alignment with expenditure of only the relatively uniform force required to overcome sliding friction. The pressure of exhaust gases, when exerted against the exposed portions of the longitudinally overlapped gate leaves upon outward movement thereof, will tend to maintain the leaves in sealing relation to minimize undesired loss of thrust forces, regardless of variations in nozzle pressure.

While the invention has been shown in several forms, it will be obvious to those skilled in the art that it is not so limited, but is susceptible of various other changes and modifications without departing from the spirit thereof.

What is claimed is:

1. Motive fluid discharge nozzle apparatus comprising substantially cylindrical casing structure terminating in a converging portion forming a nozzle opening, an annular array of circumferentially arranged elongated plates slidably mounted side by side on said converging portion and interleaved to conform to the contour thereof, each of said plates being curved with the concave side disposed inwardly and having complementary marginal sealing surfaces overlapping and cooperative with the adjacent plates to minimize leakage of fluid laterally from said passageway, each of said plates being substantially rigid and having an elevated longitudinal flange on its outer side, a common operating member encompassing said casing structure and movable longitudinally thereof, means operatively connecting said operating member to the flange of each of said plates for causing movement of said member to shift the plates partly into or out of said nozzle opening for varying the flow area thereof, a plurality of longitudinal track elements on the casing structure and rollers carried by the common operating member, said rollers being adapted to ride in said track elements for minimizing friction upon movement of the operating member.

2. A variable nozzle comprising, in combination; a plurality of similar generally spherical shaped rigid sub-segments having their downstream ends disposed in a common plane, each sub-segment having a central portion of given uniform thickness and two protruding edge portions of substantially lesser thickness, one of said edge portions being constructed to overlie and slidably engage the outer face of the edge portion of the adjacent sub-segment and the other edge portion being constructed to underlie and slidably engage the inner face of the edge portion of the adjacent sub-segment; a tube of circular cross-section having its downstream end disposed within said sub-segments; said tube having a spherically shaped hollow portion disposed adjacent its downstream end and arranged to slidably support said sub-segments for movement past the downstream end of said tube along curved paths which converge towards the axis of the tube; and means connected to each of said sub-segments and arranged to move said sub-segments along said support sufficiently to cause their downstream ends to project past the downstream end of said tube and restrict the orifice area of the nozzle.

3. A variable nozzle comprising, in combination; a cylindrical tube; an annular inner shell supported at its upstream end by said tube; an annular outer shell having its upstream end connected to the upstream end of said inner shell, said shells having concentric spaced apart spherical guide portions which slope in toward the axis of said tube; a plurality of spherically shaped rigid sub-segments disposed between and in engagement with said guide portions, each sub-segment having a curved edge portion which overlaps and has slidable engagement with the edge portion of the adjacent sub-segment, an actuating member pivotally connected to said sub-segments and arranged to simultaneously move said sub-segments along said shells and cause the downstream ends of said sub-segments to move toward the axis of said tube and reduce the orifice area of the nozzle.

4. Apparatus as set forth in claim 3 characterized by the provision of longitudinal rods on the tube structure for supporting the actuating member in slidably mounted relation.

References Cited in the file of this patent

UNITED STATES PATENTS

| | | |
|---|---|---|
| 851,603 | Long | Apr. 23, 1907 |
| 2,382,016 | Love | Aug. 14, 1945 |
| 2,509,238 | Martin | May 30, 1950 |
| 2,514,248 | Lombard et al. | July 4, 1950 |
| 2,523,842 | Oulianoff | Sept. 26, 1950 |
| 2,597,253 | Melchior | May 20, 1952 |

FOREIGN PATENTS

| | | |
|---|---|---|
| 617,173 | Great Britain | Feb. 2, 1949 |